United States Patent [19]

Kobayashi

[11] 4,431,274
[45] Feb. 14, 1984

[54] MACROLENS

[75] Inventor: Yuko Kobayashi, Hachiouji, Japan

[73] Assignee: Olympus Optical Co., Ltd., Tokyo, Japan

[21] Appl. No.: 352,565

[22] Filed: Feb. 26, 1982

[30] Foreign Application Priority Data

Feb. 27, 1981 [JP] Japan ................... 56-26864

[51] Int. Cl.³ .................... G02B 9/36; G02B 11/26
[52] U.S. Cl. ................................................ 350/471
[58] Field of Search ......................................... 350/471

[56] References Cited

FOREIGN PATENT DOCUMENTS 54-92330  7/1979  Japan .

Primary Examiner—John K. Corbin
Assistant Examiner—Rebecca D. Gass
Attorney, Agent, or Firm—Cushman, Darby & Cushman

[57] ABSTRACT

A macrolens comprising a first biconvex lens component, a second lens component consisting of a first positive lens element having the convex surface on the object side and a first negative lens element cemented to the first positive lens element, a third lens component consisting of a second negative lens element having the convex surface on the image side and a second positive lens element cemented to the second negative lens element and a fourth biconvex lens component. This macrolens has favorably corrected aberrations over the magnification range from 4 fold to 16 fold and such very bright field of view as F:2.0.

1 Claim, 4 Drawing Figures

SPHERICAL ABERRATION

ASTIGMATISM

DISTORTION

COMA (F/2.5)

SPHERICAL ABERRATION
F/2.0
F/2.5

ASTIGMATISM
Y=108
Δm — ΔS

DISTORTION
Y=108

COMA (F/2.5)
Y=108   Y=97.2   Y=75.6   Y=43.2

SPHERICAL ABERRATION

ASTIGMATISM

DISTORTION

COMA (F/2.5)

MACROLENS

BACKGROUND OF THE INVENTION (a) Field of the Invention

This invention relates to a photographic lens system and more particularly to a bright macrolens having a magnification of 4 to 6 folds.

(b) Description of the prior art

It is generally desirable that a macrolens can be utilized in a wide magnification range with one lens. However, with the variation of the magnification, the aberrations will greatly vary. Particularly, the brighter the lens, the larger the variations of the aberrations. Thus it is difficult to balance the aberrations over a wide magnification range. For such reasons, there have been few bright macrolenses available in a wide magnification range.

SUMMARY OF THE INVENTION

In view of the above, a primary object of the present invention is to provide a macrophotographic lens wherein the aberrations are well corrected over a wide magnification range of 4 to 16 folds and the field of view of the finder is so bright as to be of F/2.0.

According to the present invention, the spherical aberration and off-axial image position movement by the variation of the magnification are made small and the off-axial image position moving directions and movements in the respective variations of the magnification are made equal so as to make the axial and off-axial best image positions coincide with each other over a wide magnification range. Further, the best image position by the spherical aberration in the fully opened stop state, the best image position by the spherical aberration in the stopped-down state and the best image position by the off-axial aberration are made to coincide with one another. As in the above, a macrolens which can be utilized over a wide magnification range of 4 to 16 folds can be designed.

The macrolens according to the present invention designed on the basis of the above contents is of the lens formation shown in FIG. 1, that is, a lens system comprising, in the order from the object side, a first biconvex lens component, a second lens component consisting of a positive lens element with the convex surface on the object side and a negative lens element cemented to the positive lens element, a third lens component consisting of a negative lens element with the convex surface on the image side and a positive lens element cemented to the negative lens element and a fourth biconvex lens component.

DESCRIPTION OF THE PREFERRED EMBODIMENT

Now, numerical data will be described below as a preferred embodiment of the macrolens according to the present inventions.

$f = 100$

| | | |
|---|---|---|
| $r_1 = 68.8393$ | | |
| $d_1 = 9.5$ | $n_1 = 1.7725$ | $v_1 = 49.66$ |
| $r_2 = -1227.853$ | | |
| $d_2 = 0.65$ | | |
| $r_3 = 36.8254$ | | |
| $d_3 = 11.89$ | $n_2 = 1.72916$ | $v_2 = 54.68$ |
| $r_4 = 331.6319$ | | |
| $d_4 = 3.75$ | $n_3 = 1.72825$ | $v_3 = 28.46$ |
| $r_5 = 26.4199$ | | |
| $d_5 = 19.55$ | | |
| $r_6 = -28.9329$ | | |
| $d_6 = 3.855$ | $n_4 = 1.7725$ | $v_4 = 49.66$ |
| $r_7 = 248.9722$ | | |
| $d_7 = 11.675$ | $n_5 = 1.6228$ | $v_5 = 57.06$ |
| $r_8 = -39.9277$ | | |
| $d_8 = 0.545$ | | |
| $r_9 = 1133.0637$ | | |
| $d_9 = 11.4$ | $n_6 = 1.7432$ | $v_6 = 49.31$ |
| $r_{10} = -102.2767$ | | | wherein reference symbol f represents the total focal length of the entire lens system, reference symbols $r_1$ through $r_{10}$ represent radii of curvature on the surfaces of the respective lens components, reference symbols $d_1$ through $d_9$ represent thicknesses of the respective lens components and airspaces reserved therebetween, reference symbols $n_1$ through $n_6$ represent refractive indices of the respective lens components, and reference symbols $v_1$ through $v_6$ represent Abbe's numbers of the respective lens components.

Figure 1:
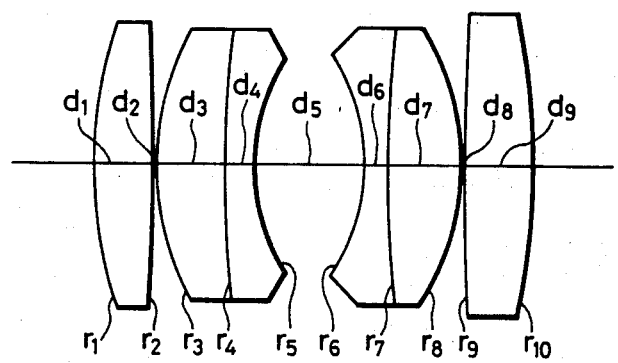
FIG. 1 is a sectional view showing the composition of the macrolens according to the present invention.
Figure 2:
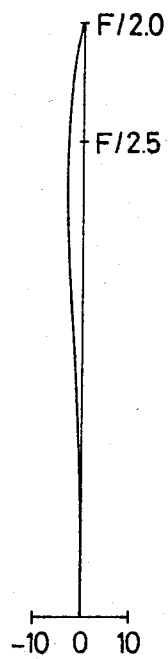
FIGS. 2 through 4 are curves respectively showing aberrations of the macrolens according to the present invention.
Figure 2:
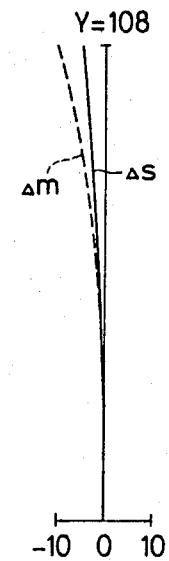
Figure 2:
Figure 2:
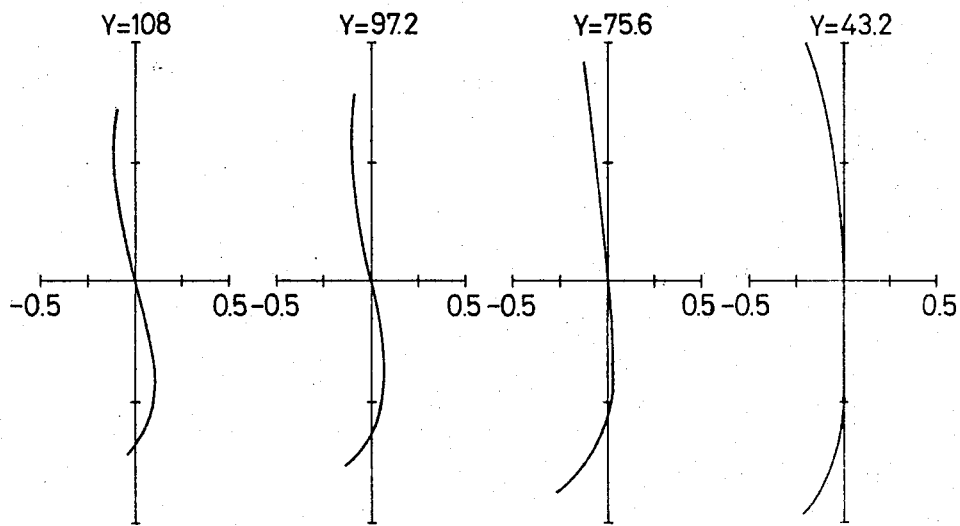
Figure 3:
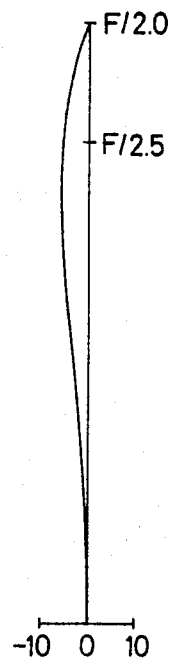
Figure 3:
Figure 3:
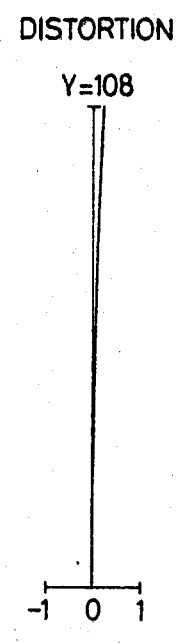
Figure 3:
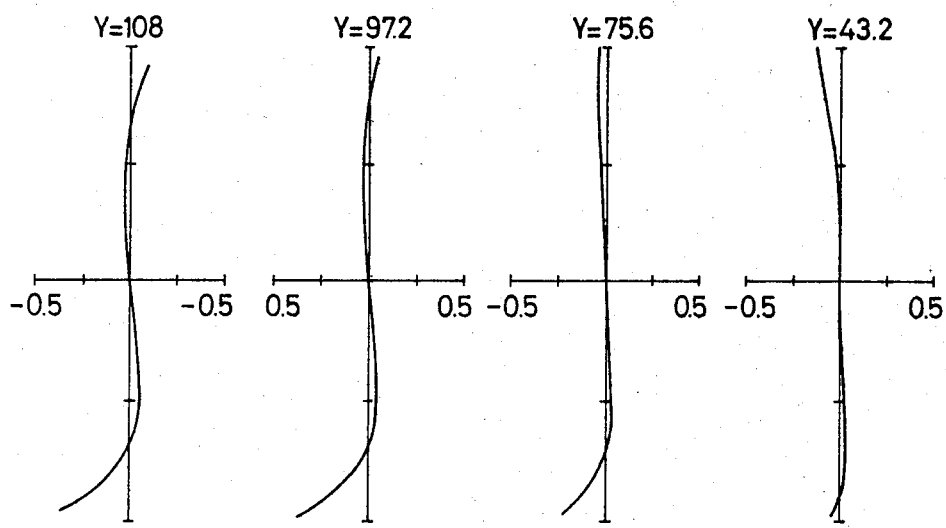
Figure 4:
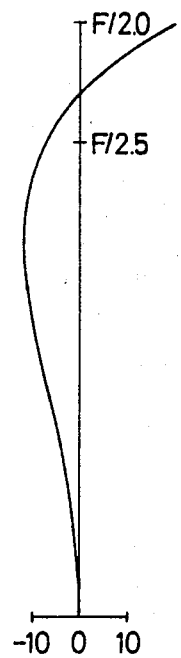
Figure 4:
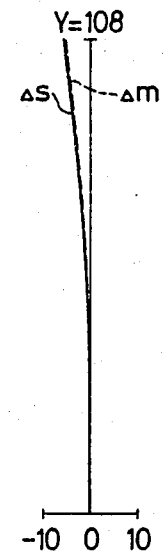
Figure 4:
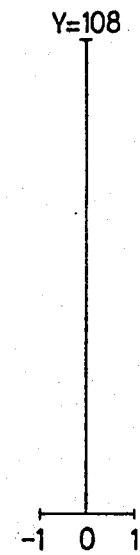
Figure 4:
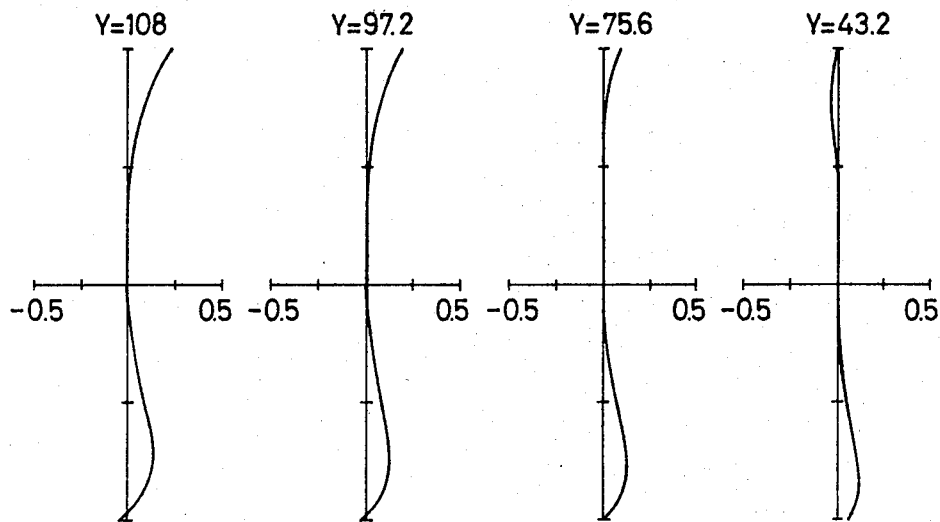

The aberration curve diagrams of the above embodiments are shown in FIGS. 2 to 4. Among these diagrams, FIG. 2 shows various aberrations when the magnification is of 4 fold, FIG. 3 shows various aberrations when it is of 6.7 fold and FIG. 4 shows various aberrations when it is of 16 fold.

As evident from these aberration curve diagrams, at the respective magnifications, various aberrations are favorable, well balanced and corrected.

By the way, among the aberration diagrams, the coma is shown at F/2.5. In the lens system of the present invention, the image is formed at F/2, is then stopped down and is photographed. Therefore, all the off-axial aberrations are corrected for F/2.5. Further, the spherical aberration is well corrected up to F/2. However, in order to make the axial best image position and the off-axial best image position coincide with each other, the spherical aberration is so considered as to be of a positive value near F/2 depending on the magnification.

I claim:

1. A macrolens comprising a first biconvex lens component, a second lens component consisting of a first positive lens element having the convex surface on the object side and a first negative lens element cemented to said first positive lens element, a third lens component consisting of a second negative lens element having the convex surface on the image side and a second positive lens element cemented to said second negative lens element and a fourth biconvex lens component, and said macrolens having numerical data as given below:

$f = 100$

| | | |
|---|---|---|
| $r_1 = 68.8393$ | | |
| $d_1 = 9.5$ | $n_1 = 1.7725$ | $v_1 = 49.66$ |
| $r_2 = -1227.853$ | | |
| $d_2 = 0.65$ | | |
| $r_3 = 36.8254$ | | |
| $d_3 = 11.89$ | $n_2 = 1.72916$ | $v_2 = 54.68$ |

-continued f = 100

| | | |
|---|---|---|
| $r_4 = 331.6319$ | | |
| $d_4 = 3.75$ | $n_3 = 1.72825$ | $v_3 = 28.46$ |
| $r_5 = 26.4199$ | | |
| $d_5 = 19.55$ | | |
| $r_6 = -28.9329$ | | |
| $d_6 = 3.855$ | $n_4 = 1.7725$ | $v_4 = 49.66$ |
| $r_7 = 248.9722$ | | |
| $d_7 = 11.675$ | $n_5 = 1.6228$ | $v_5 = 57.06$ |
| $r_8 = -39.9277$ | | |
| $d_8 = 0.545$ | | |
| $r_9 = 1133.0637$ | | |
| $d_9 = 11.4$ | $n_6 = 1.7432$ | $v_6 = 49.31$ |

-continued f = 100

| |
|---|
| $r_{10} = -102.2767$ | wherein reference symbol f represents the total focal length of the entire lens system, reference symbols $r_1$ through $r_{10}$ represent radii of curvature on the surfaces of the respective lens components, reference symbols $d_1$ through $d_9$ represent thicknesses of the respective lens components and airspaces reserved therebetween, reference symbols $n_1$ through $n_6$ represent refractive indices of the respective lens components, and reference symbols $v_1$ through $v_6$ represent Abbe's numbers of the respective lens components.

* * * * *